United States Patent
Chang

(10) Patent No.: US 9,471,736 B2
(45) Date of Patent: Oct. 18, 2016

(54) COMPUTING SYSTEM AUTOMATICALLY GENERATING A TRANSACTOR

(71) Applicant: SAMSUNG ELECTRONICS CO., LTD., Suwon-Si, Gyeonggi-Do (KR)

(72) Inventor: In-Gwang Chang, Seongnam-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 23 days.

(21) Appl. No.: 14/631,898

(22) Filed: Feb. 26, 2015

(65) Prior Publication Data
US 2015/0339424 A1    Nov. 26, 2015

(30) Foreign Application Priority Data

May 22, 2014 (KR) ........................ 10-2014-0061773

(51) Int. Cl.
*G06F 17/50* (2006.01)
*G06F 11/00* (2006.01)
*G01R 31/28* (2006.01)
*G06F 13/20* (2006.01)

(52) U.S. Cl.
CPC ........... *G06F 17/5068* (2013.01); *G06F 13/20* (2013.01); *G06F 17/50* (2013.01); *G01R 31/28* (2013.01); *G06F 11/00* (2013.01)

(58) Field of Classification Search
CPC .. G06F 3/00; G06F 17/5045; G06F 2217/66; G06F 17/5068; G06F 17/50; G06F 13/20; G06F 11/00
USPC ................ 716/136, 138, 111; 710/8, 16, 36; 714/4.5, 30, 36, 43, 56
See application file for complete search history.

(56) References Cited

U.S. PATENT DOCUMENTS

| | | | | |
|---|---|---|---|---|
| 5,594,741 A | * | 1/1997 | Kinzelman | ...... G01R 31/31830 706/920 |
| 5,732,247 A | * | 3/1998 | Dearth | ................ G06F 17/5022 703/13 |
| 6,549,881 B1 | * | 4/2003 | Dearth | ................ G06F 17/5022 703/21 |
| 7,313,738 B2 | | 12/2007 | Bueti et al. | |
| 7,472,054 B2 | * | 12/2008 | Garcia | ................ G06F 17/5022 703/14 |
| 7,472,055 B2 | * | 12/2008 | Garcia | ................ G06F 17/5022 703/14 |
| 7,607,116 B2 | | 10/2009 | Kwon | |
| 8,165,865 B2 | * | 4/2012 | Parker | ................ G06F 17/5022 703/14 |
| 8,429,457 B2 | | 4/2013 | Harris et al. | |
| 8,543,367 B1 | | 9/2013 | Van Rompaey et al. | |
| 2006/0282586 A1 | | 12/2006 | Shibuya | |
| 2007/0129920 A1 | | 6/2007 | Kampf et al. | |

(Continued)

FOREIGN PATENT DOCUMENTS

KR     1020100056652 A    6/2010

*Primary Examiner* — Phallaka Kik
(74) *Attorney, Agent, or Firm* — Volentine & Whitt, PLLC

(57) ABSTRACT

A computing system includes a memory device into which a design file for a predetermined intellectual property (IP) and a transactor generating tool are loaded, and a processor configured to execute the transactor generating tool loaded into the memory device. The transactor generating tool executed by the processor extracts port information of the IP from the design file, and generates at least one transactor corresponding to the IP based on the port information.

13 Claims, 12 Drawing Sheets

(56) References Cited

U.S. PATENT DOCUMENTS

| | | | |
|---|---|---|---|
| 2008/0077896 A1* | 3/2008 | Iwashita | G06F 17/5031 716/102 |
| 2008/0120082 A1* | 5/2008 | Alexanian | G06F 17/504 703/14 |
| 2008/0120085 A1* | 5/2008 | Alexanian | G06F 17/5022 703/14 |
| 2008/0313587 A1* | 12/2008 | Nightingale | G06F 11/261 716/106 |
| 2009/0037858 A1* | 2/2009 | Thakur | G06F 17/5081 716/106 |
| 2009/0144679 A1* | 6/2009 | Patel | G06F 17/5081 716/106 |
| 2011/0041106 A1* | 2/2011 | Li | G06F 17/5022 716/106 |
| 2011/0145646 A1* | 6/2011 | Harris | G06F 11/263 714/37 |
| 2011/0307847 A1 | 12/2011 | Liao et al. | |
| 2012/0143583 A1 | 6/2012 | Huang et al. | |
| 2012/0245915 A1 | 9/2012 | Kageshima | |
| 2013/0054854 A1 | 2/2013 | Li et al. | |
| 2015/0161600 A1* | 6/2015 | Kahan | G06F 3/04886 705/39 |

* cited by examiner

FIG. 5

```
$AW =
(aw_?id|aw_?addr|aw_?len|aw_?size|aw_?burst|aw_?lock|aw_?cache|aw_?prot|aw_?user|aw_?valid|aw_?ready);
$W = (w_?id|w_?data|w_?strb|w_?last|w_?valid|w_?ready);
$B = (b_?id|b_?resp|b_?user|b_?valid|b_?ready);
$AR =
(ar_?id|ar_?addr|ar_?len|ar_?size|ar_?burst|ar_?lock|ar_?cache|ar_?prot|ar_?user|ar_?valid|ar_?ready);
$R = (r_?id|r_?data|r_?resp|r_?last|r_?user|r_?valid|r_?ready);
PORT_NAME =~ /$AW|$W|$B|$AR|$R/;
```
600a

| | PORT_NAME | BIT_WIDTH | DIRECTION |
|---|---|---|---|
| PORT GROUP1 | AWID_GRP1 | 4 | OUT |
| | AWADDR_GRP1 | 32 | OUT |
| | ⋮ | ⋮ | ⋮ |
| PORT GROUP2 | AWID_GRP2 | 4 | OUT |
| | AWADDR_GRP2 | 32 | OUT |
| | ⋮ | ⋮ | ⋮ |

420b

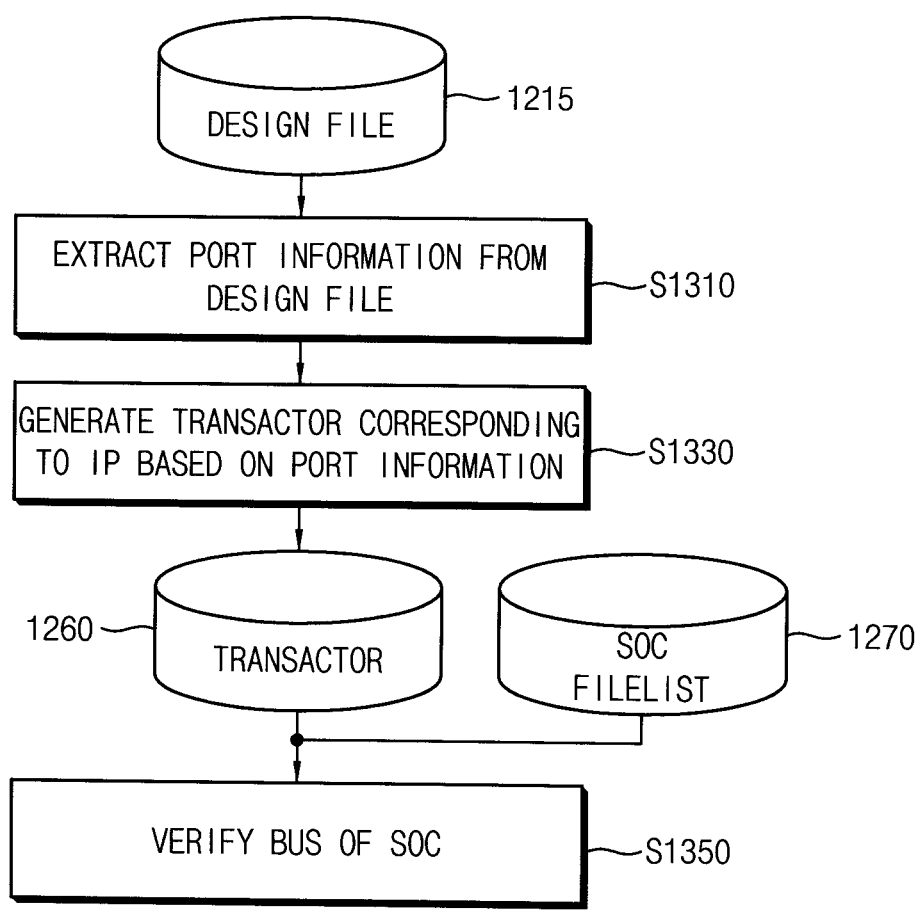

COMPUTING SYSTEM AUTOMATICALLY GENERATING A TRANSACTOR

CROSS-REFERENCE TO RELATED APPLICATIONS

This U.S. non-provisional application claims priority under 35 U.S.C. §119 to Korean Patent Application No. 10-2014-0061773 filed on May 22, 2014, the subject matter of which is hereby incorporated by reference.

BACKGROUND

Embodiments of the inventive concept relate generally to design verification tools. More particularly, embodiments of the inventive concept relate to computing systems capable of automatically generating one or more transactor(s) that may be used to verify the operating design of a bus.

Most contemporary electronic systems include at least one bus. The term "bus" typically denotes a set of conductive signal paths (e.g., wires, traces, through-vias, pads, terminal, and/or conductive regions, etc.) capable of respectively and/or collectively communicating one or more electrical signals. With increasing complexity of data, address and controls signals, bus architectures and usage approaches have become increasing sophisticated. In addition, many electronic systems are increasingly implemented as a system-on-chip (SoC).

Electronic systems including SoCs communicate a great variety of signals over one or more buses in response to the execution of certain functional block(s), each generically referred to as an "intellectual property" or IP. There are many different types and forms of IPs, and a great variety of IPs may be interoperated within an electronic system.

Thus, during execution an IP will provide one or more related signals to a bus. However, exercising respective IPs coupled to a particular bus during system testing can be very challenging. Since it so difficult to accurately control the provision of IP signals to a bus, a so-called "transactor" is commonly used. Conventionally, a transactor is manually generated by a system tester. However, this manual generation of transactor(s) replacing an IP takes a considerable amount of time. Further, as the number of IPs included in an SoC increases, the generation of corresponding transactors requires an ever more extended amount of time. Accordingly, the testing resources required to effectively verify the operation of a SoC bus have become increasingly burdensome.

SUMMARY

Certain embodiments of the inventive concept provide a computing system capable of automatically generating a transactor. Certain embodiments of the inventive concept provide a computing system capable of verifying the operation of a bus in a system-on-chip (SoC) in relation to one or more intellectual properties.

According to one embodiment of the inventive concept there is provided a computing system including a memory device configured to store a design file associated with an intellectual property (IP) and a transactor generating tool; and a processor configured to execute the transactor generating tool stored in the memory device, wherein the transactor generating tool when executed by the processor extracts port information for the IP from the design file and generates at least one transactor associated with the IP based on the port information.

According to one embodiment of the inventive concept there is provided a computing system including; a memory device that stores a design file associated with an intellectual property (IP), a transactor generating tool and a bus verification tool, and a processor configured to execute the transactor generating tool and the bus verification tool stored in the memory device, wherein the transactor generating tool upon being executed by the processor extracts port information from the design file and automatically generates at least one transactor associated with the IP based on the extracted port information, and the bus verification tool upon being executed by the processor verifies performance of a bus connected to the IP using the at least one transactor.

According to one embodiment of the inventive concept there is provided a method of verifying the performance of a bus in a system-on-chip including an intellectual property (IP) connected to the bus. The method includes using a transactor generating tool stored in a memory device and executed by a processor to extract port information from a design file associated with the IP, and automatically generate at least one transactor associated with the IP based on the port information.

BRIEF DESCRIPTION OF THE DRAWINGS

Selected embodiments of the inventive concept are illustrated in relevant part in the accompanying drawings.

FIG. 5 is a programming code listing example capable of implementing the step of checking ports included in a port list.

FIG. 13 is a flowchart summarizing a method of verifying bus performance using at least one transactor according to certain embodiments of the inventive concept.

DETAILED DESCRIPTION

Various embodiments of the inventive concept will now be described in some additional detail with reference to the accompanying drawings. The inventive concept may, however, be embodied in many different forms and should not be construed as being limited to only the illustrated embodiments. Throughout the written description and drawings, like reference numbers and labels refer to like or similar elements.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting of the inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure (FIG.) 1 is a block diagram illustrating a computing system that may be used to automatically generate a transactor using a method according to certain embodiments of the inventive concept.

Figure 1:
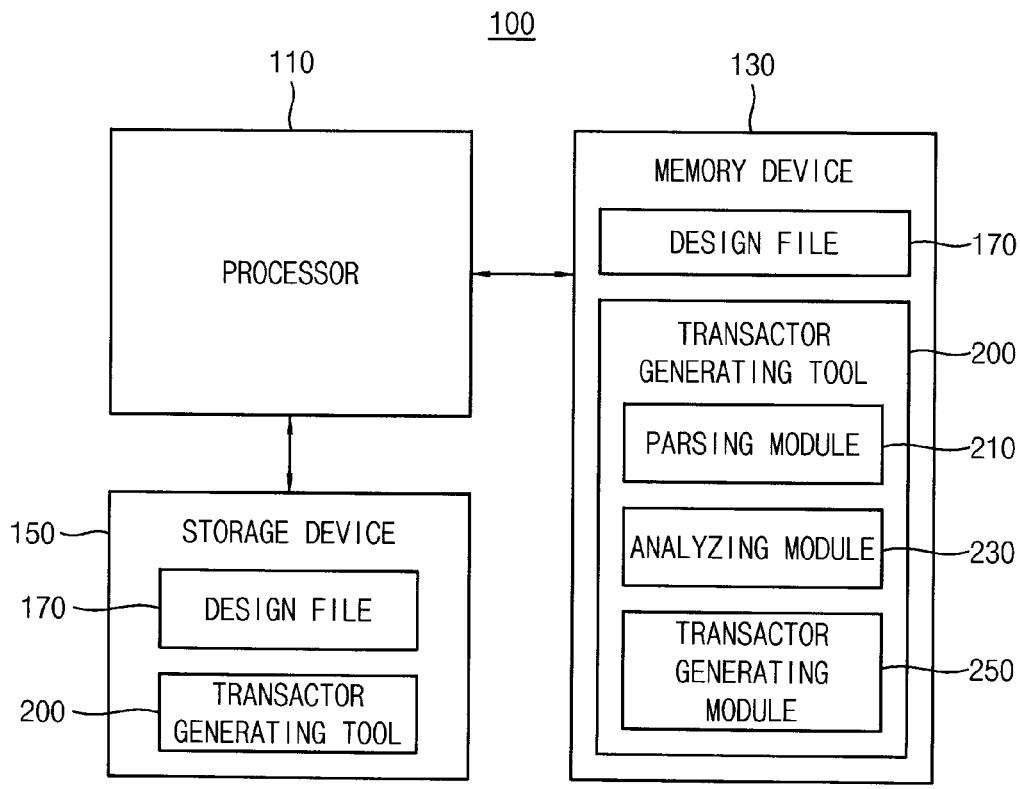
FIG. 1 is a block diagram illustrating a computing system that generates at least one transactor associated with an intellectual property (IP) according to an embodiment of the inventive concept.

Referring to FIG. 1, a computing system 100 generally comprises a processor 110, and a memory device 130 capable of receiving and storing a "design file" 170 associated with a functional block or "intellectual property" (IP). In certain embodiments, a transactor generating tool 200 may also be stored by the memory device 130. In the illustrated example shown in FIG. 1, the computing system 100 further comprises a storage device 150, such as a solid state drive (SSD), a hard disk drive (HDD), a memory card, a CD-ROM, etc.

The memory device 130 may be configured to operate as a main memory of the computing system 100, and in this capacity it may be used to store data required for operation of the computing system 100. The memory device 130 may be variously configured from one or more volatile memory device(s), such as a dynamic random access memory (DRAM), a static random access memory (SRAM), a mobile DRAM, a double data rate (DDR) synchronous dynamic random access memory (SDRAM), a low power DDR (LPDDR) SDRAM, a graphics DDR (GDDR) SDRAM, an Rambus DRAM (RDRAM), etc., or one or more nonvolatile memory device(s), such as an electrically erasable programmable read-only memory (EEPROM), a flash memory, a phase random access memory (PRAM), a ferroelectric random access memory (FRAM), a resistive random access memory (RRAM), a magnetic random access memory (MRAM), etc.

The processor 110 may be used to load the design file 170 and transactor generating tool 200 into the memory device 130. For example, the design file 170 and transactor generating tool 200 may initially be stored in the storage device 150, and the processor 110 may be used to load the design file 170 and transactor generating tool 200 from the storage device 150 to the memory device 130.

The design file 170 is associated with an IP coupled to a bus to be operationally verified. The design file 170 may be variously designed and constructed. For example, the design file 170 may be written in a hardware description language (HDL) such as a Verilog, a very high speed integrated circuit (VHSIC) hardware description language (VHDL), etc. The design file 170 may be associated with an IP included in a system-on-chip (SoC). For example, the design file 170 may be associated with an IP such as those commonly associated with a central processing unit (CPU), a memory, a memory controller (MC), a power management unit (PMU), a graphic processing unit (GPU), a multi-format codec (MFC) block, a file system (FSYS) block, an image signal processor (ISP), or the like. As will be appreciated, many of these IP are commonly included in a SoC.

The processor 110 may execute the transactor generating tool 200 loaded into the memory device 130. The transactor generating tool 200 executed by the processor 110 may extract port information related to the IP from the design file 170, and generate at least one transactor corresponding to the IP in response to the extracted port information. In some embodiments, the port information may include at least one of; port type information, bit width information, transfer direction information, channel type information, and/or bus type information for at least one port associated with the IP. The transactor generated by the transactor generating tool 200 may be stored in the memory device 130 or the storage device 150 using a desired data format or file format.

In some embodiments, the transactor generating tool 200 will include a parsing module 210 capable of generating a port list for a plurality of ports associated with the IP by parsing the design file 170. The transactor generating tool 200 may also include an analyzing module 230 capable of generating port information for the IP by analyzing the port list, and a transactor generating module 250 capable of generating the transactor corresponding to the IP in response to (or "based on") the port information for the IP.

The transactor generated by the transactor generating tool 200 may transmit a signal to or receive a signal from a bus being verified in its operation with respect to an IP. Here, the transactor generated by the transactor generating tool 200 may include configuration information or a transactor configuration file that configures an operation of the transactor, or a transactor component transmitting the signal to or receiving the signal from the bus based on the transactor configuration information or the transactor configuration file. Here, the phrase "generating the transactor" in the context of describing the transactor generating tool 200 means generating transactor configuration information, a transactor configuration file, or some analogous transactor component capable of emulating the transmission or receipt of at least one signal via the bus being verified. Alternately or additionally, the phrase "generating the transactor" in the context of describing the transactor generating tool 200 means generating an empty design file for the IP wherein an internal unit is removed from the design file 170, the transactor configuration information, the transactor configuration file, or a related transactor component.

As described above, by executing the transactor generating tool 200, the computing system 100 of FIG. 1 may extract port information for an IP from the design file 170, and then automatically generate at least one transactor corresponding to the IP based on the port information. Since the transactor is automatically generated by the computing system 100, the human error often introduced during manual generation of the transactor is prevented. Further, the time required to generate the transactor may be markedly reduced, such that the overall time required to operationally verify the bus of a SoC may be reduced.

Figure 2:
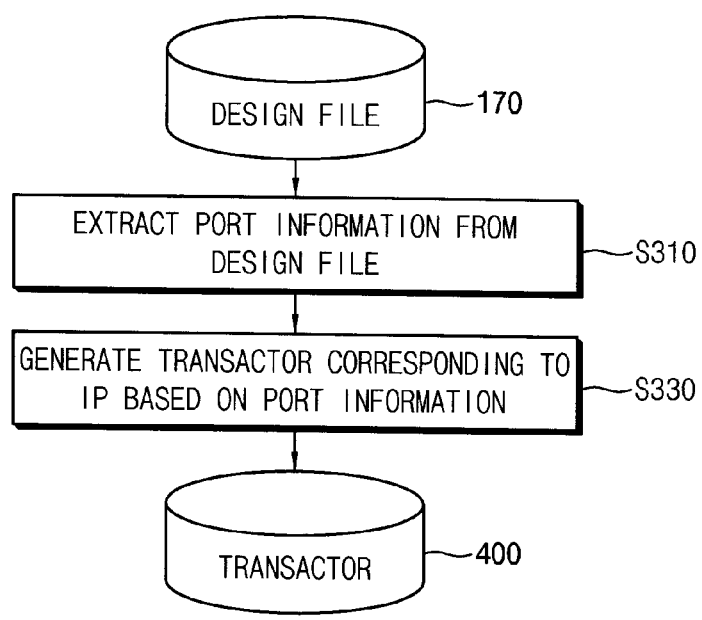
FIG. 2 is a flowchart summarizing a method of generating at least one transactor associated with an IP according to an embodiment of the inventive concept.

FIG. 2 is a flow chart generally summarizing a method of generating a transactor according to certain embodiments of the inventive concept.

Referring to FIGS. 1 and 2, the transactor generating tool 200 as executed by the processor 110 may be used to extract port information from the design file 170 (S310). As noted above, the port information may include at least one of; port type information, bit width information, transfer direction information, channel type information and bus type information for at least one port associated with the IP.

In this exemplary regard, the port type information may correlate signal and port for a write address channel signal (e.g., a write address ID (AWID) signal, a write address (AWADDR) signal, a write burst length (AWLEN) signal, a write burst size (AWSIZE) signal, a write burst type (AWBURST) signal, a write lock type (AWLOCK) signal, a write memory type (AWCACHE) signal, a write protection type (AWPROT) signal, a write quality of service (AWQOS) signal, a write region identifier (AWREGION) signal, a write address user (AWUSER) signal, a write address valid (AWVALID) signal, a write address ready (AWREADY) signal, etc.), a write data channel signal (e.g., a write ID tag (WID) signal, a write data (WDATA) signal, a write strobes (WSTRB) signal, a write last (WLAST) signal, a write data user (WUSER) signal, a write ready (WREADY) signal, etc.), a write response channel signal (e.g., a response ID tag (BID) signal, a write response (BRESP) signal, a write response user (BUSER) signal, a write response valid (BVALID) signal, a response ready (BREADY) signal, etc.), a read address channel signal (e.g., a read address ID (ARID) signal, a read address (ARADDR) signal, a read burst length (ARLEN) signal, a read burst size (ARSIZE) signal, a read burst type (ARBURST) signal, a read lock type (ARLOCK) signal, a read memory type (ARCACHE) signal, a read protection type (ARPROT) signal, a read quality of service (ARQOS) signal, a read region identifier (ARREGION) signal, a read address user signal (ARUSER) signal, a read address valid (ARVALID) signal, a read address ready (ARREADY) signal, etc.) and a read data channel signal (e.g., a read ID tag (RID) signal, a read data (RDATA) signal, a read response (RRESP) signal, a read last (RLAST) signal, a read data user (RUSER) signal, a read valid (RVALID) signal, a read ready (RREADY) signal, etc.).

Further in this exemplary regard, the bit width information may represent a bit width of the port, or the number of bits of the port, the transfer direction information may represent whether the port is a port transmitting a signal to a bus or a port receiving a signal from the bus, the channel type information may represent that the port is a port of which channel of a write address channel, a write data channel, a write response channel, a read address channel and a read data channel, and the bus type information may represent that the port is a port of which bus of an advanced extensible interface (AXI) bus, an AXI-Lite bus, an AXI coherency extensions (ACE) bus, an ACE-Lite bus, an advanced high performance bus (AHB), an advanced system bus (ASB) and an advanced peripheral bus (APB).

After the port information has been extracted from the design file, the transactor generating tool 200 may be used to generate at least one transactor 400 corresponding to the IP based on the port information (S330). In various embodiments, the transactor generating tool 200 may generate, as the transactor 400, transactor configuration information (or a transactor configuration file), a transactor component (which may be implemented as a software), or both of the transactor configuration information and the transactor component. The transactor generating tool 200 may further be used to generate an empty design file for the IP from which an internal unit has been removed from the design file 170. The empty design file for the IP may be inserted instead of the design file 170 into a file list for the SoC. If this approach is used the IP will not actually operate while the corresponding SoC bus is being verified. Rather, during bus verification the transactor 400 will be used to transmit a signal to or receive a signal from the bus instead of the fully functional IP.

Thus, using a method like the one described above, the transactor 400 associated with an IP may be automatically generated with no human error introduced into the process and with the time required to generate the transactor and verify the SoC bus being greatly reduced.

Figure 3:
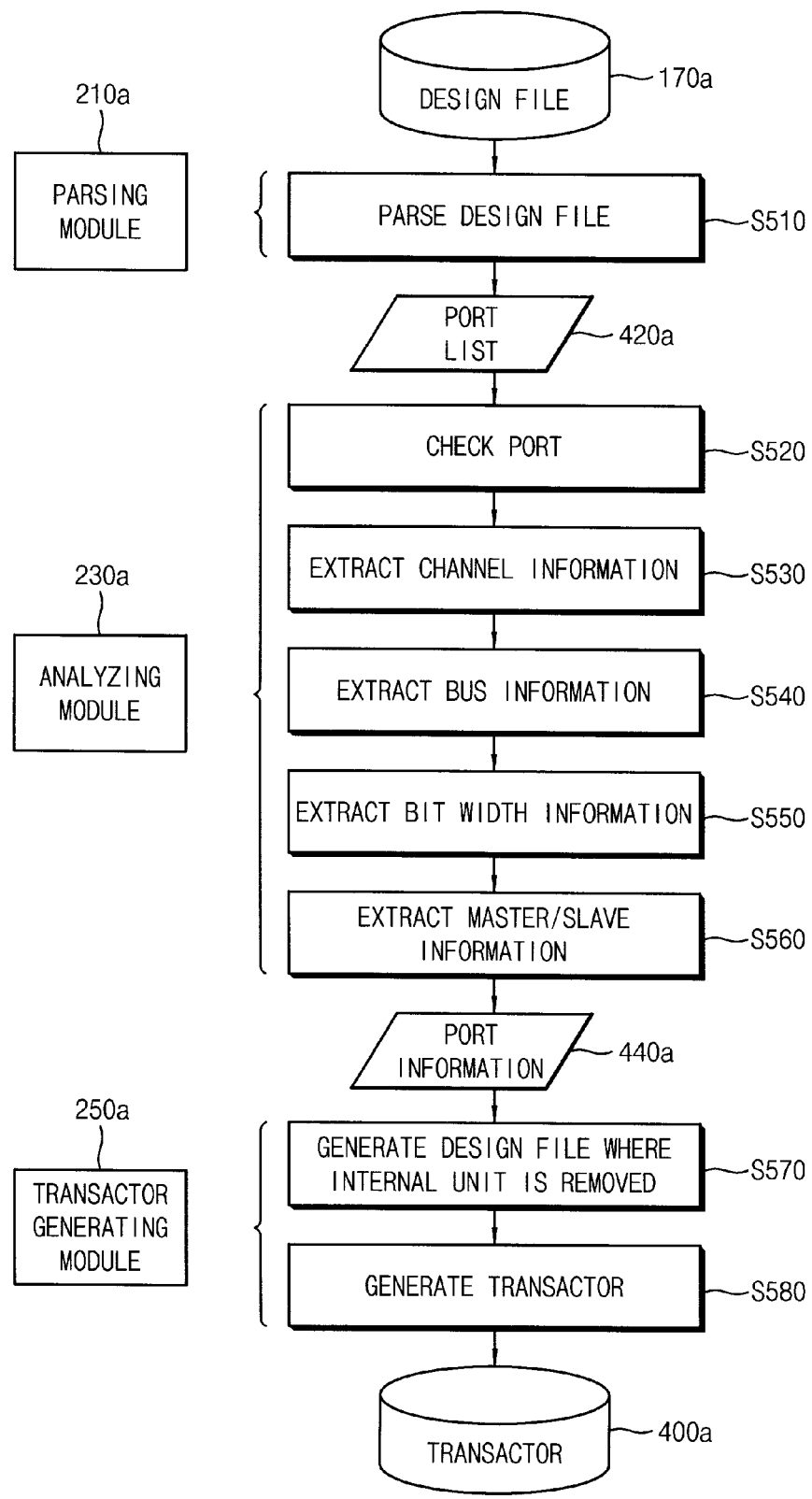
FIG. 3 is a somewhat more detailed flowchart summarizing a method of generating at least one transactor associated with an IP according to an embodiment of the inventive concept.
Figure 4:
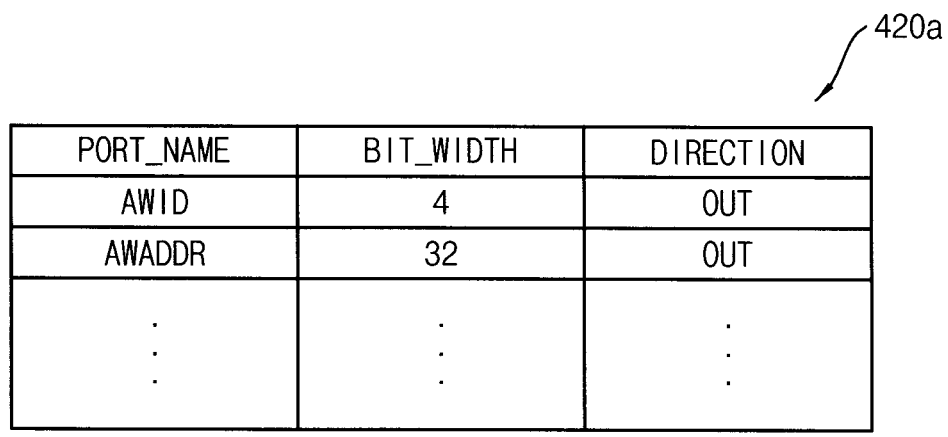
FIG. 4 is a table listing one example of the port list of FIG. 3.
Figure 6A:
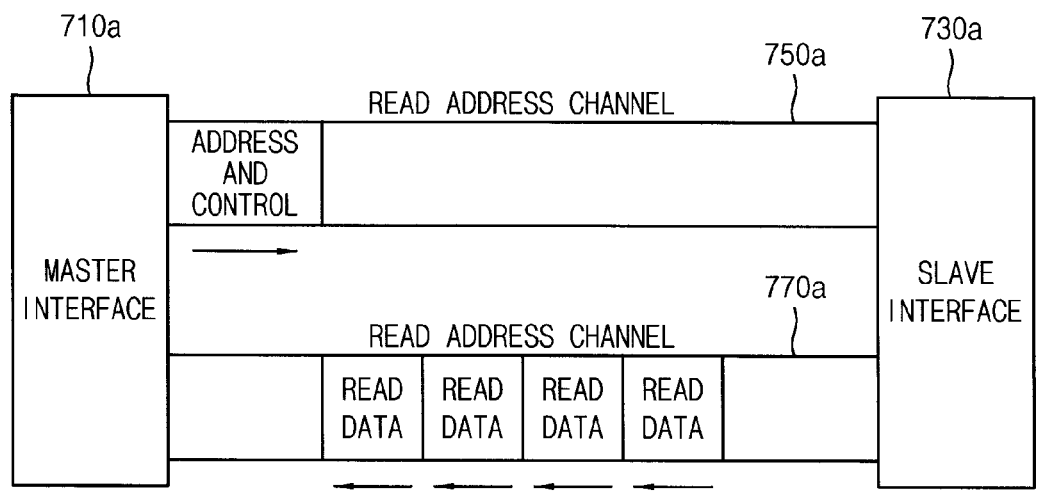
FIG. 6, inclusive of FIGS. 6A and 6B, is diagrams describing an example of operating bus channels associated with an IP.
Figure 6B:
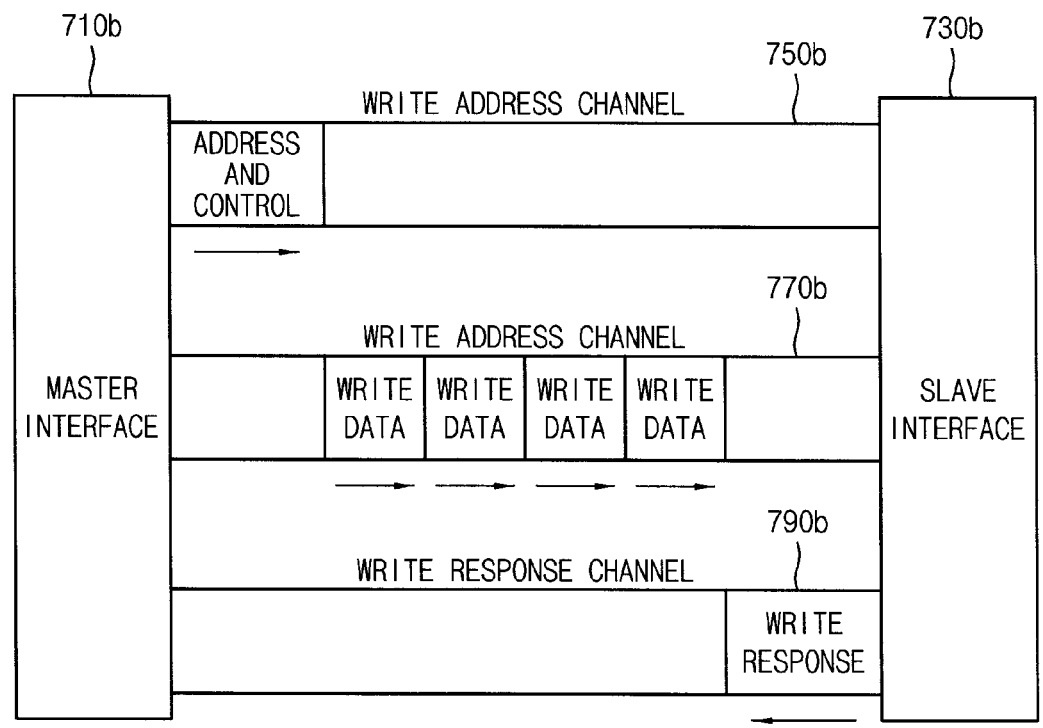
Figure 7:
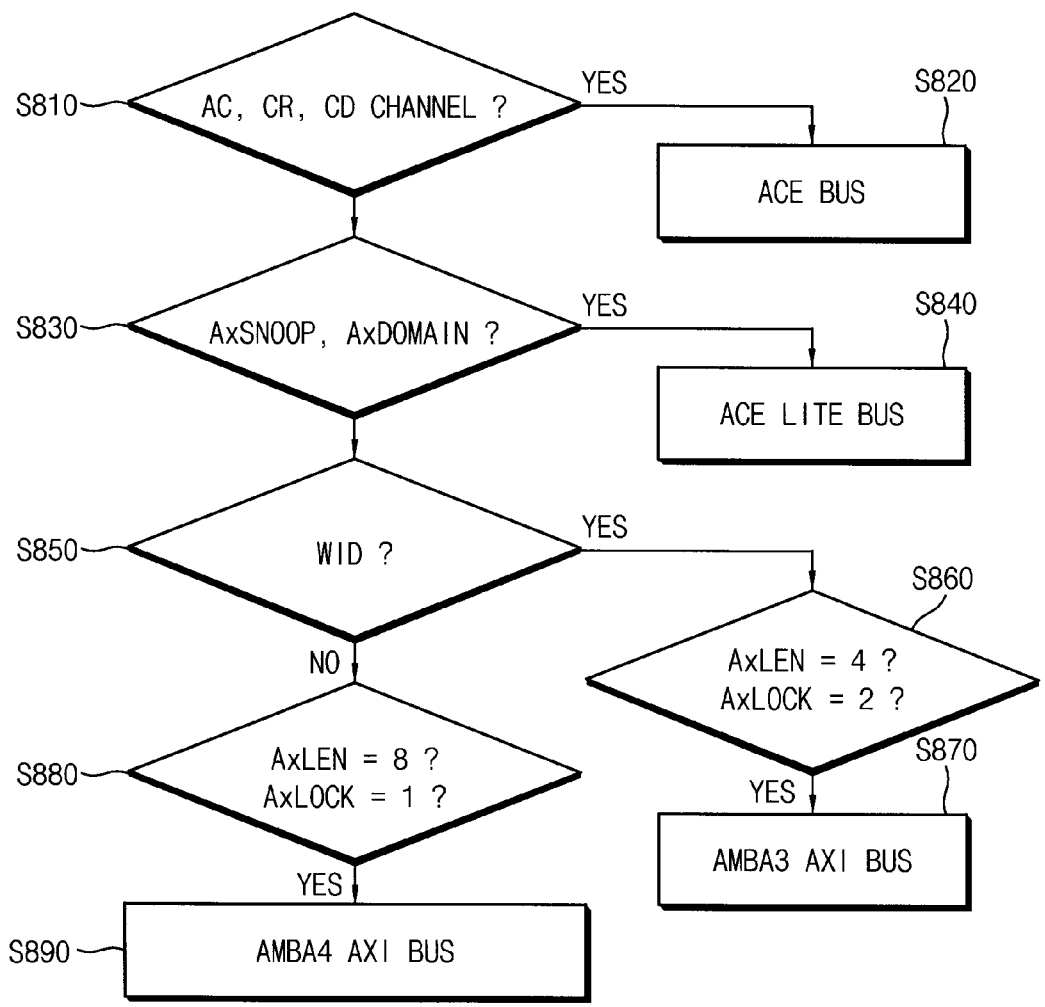
FIG. 7 is a flowchart describing the step of extracting bus type information.
Figure 8A:
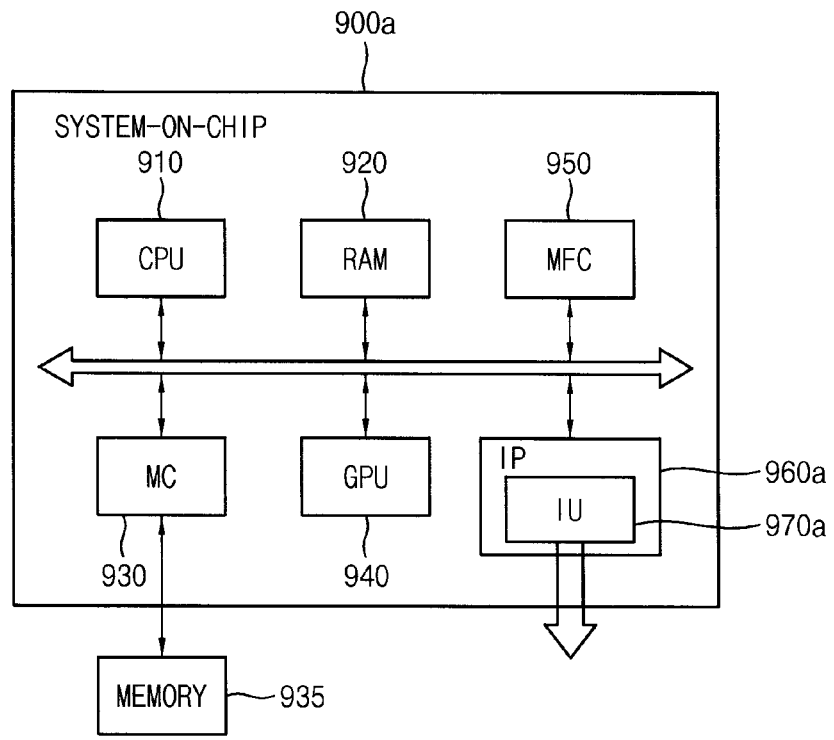
FIG. 8A is a block diagram illustrating an example of SoC including an IP having its internal unit.
Figure 8B:
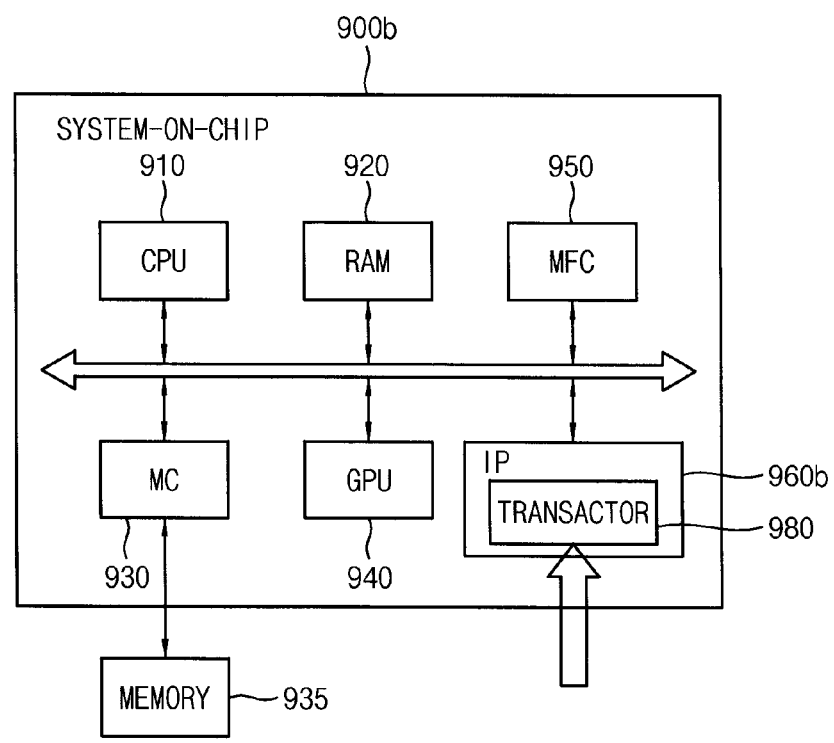
FIG. 8B is a comparative block diagram illustrating an example of SoC including an IP having its internal unit replaced with a transactor.

FIG. 3 is a flowchart summarizing a more detailed method of generating a transactor according to certain embodiments of the inventive concept. FIG. 4 is a table listing one possible example of a port list of the type generated by the method of FIG. 3. FIG. 5 is an exemplary listing of programming code that may be used to implement the step of checking ports included in a port list. FIG. 6, inclusive of FIGS. 6A and 6B, is a conceptual diagram illustrating operation of bus channels in relation to an intellectual property (IP). FIG. 7 is a flowchart summarizing in one example the step of extracting bus type information. FIG. 8, inclusive of FIGS. 8A and 8B is a comparative example between a SoC including an IP having its internal unit intact (the block diagram of 8A) and a SoC including an IP having its internal unit replaced by a transactor (the block diagram of 8B).

Referring to FIG. 3, a parsing module 210*a* may be used to generate a port list 420*a* for a plurality of ports of an IP by parsing a design file 170*a* associated with an IP (S510). In some embodiments, as illustrated in FIG. 4, the port list 420*a* may be a list of port names (PORT_NAME), bit widths (BIT_WIDTH) and directions (DIRECTION) of the plurality of ports of the IP. For example, the port list 420*a* of FIG. 4 include a port having a port name of "AWID", a bit width of 4 and a direction where a signal is output, and a port having a port name of "AWADDR", a bit width of 32 and a direction where a signal is output.

An analyzing module 230a may be used to generate port information 440a for the IP by analyzing the port list 420a (S520, S530, S540, S550 and S560).

Thus, the analyzing module 230a may be used to determine whether each port included in the port list 420a is a bus port that satisfies a predetermined standard (S520). In some embodiments, the analyzing module 230a may be used to determine whether each port is a port of a bus of advanced microcontroller bus architecture (AMBA) standard. For example, the analyzing module 230a may be used to determine whether each port is the port of the AMAB bus (e.g., an AXI bus, an AXI-Lite bus, an ACE bus, an ACE-Lite bus, etc.) by using a regular expression 600a (e.g., a Perl regular expression) illustrated in FIG. 5. The regular expression 600a of FIG. 5 may define a variable 'SAW' for a name of a port for a write address channel signal (e.g., an AWID signal, an AWADDR signal, an AWLEN signal, an AWSIZE signal, an AWBURST signal, an AWLOCK signal, an AWCACHE signal, an AWPROT signal, an AWQOS signal, an AWREGION signal, an AWUSER signal, an AWVALID signal, an AWREADY signal, etc.), a variable '$W' for a name of a port for a write data channel signal (e.g., a WID signal, a WDATA signal, a WSTRB signal, a WLAST signal, a WUSER signal, a WREADY signal, etc.), a variable '$B' for a name of a port for a write response channel signal (e.g., a BID signal, a BRESP signal, a BUSER signal, a BVALID signal, a BREADY signal, etc.), a variable '$AR' for a name of a port for a read address channel signal (e.g., an ARID signal, an ARADDR signal, an ARLEN signal, an ARSIZE signal, an ARBURST signal, an ARLOCK signal, an ARCACHE signal, an ARPROT signal, an ARQOS signal, an ARREGION signal, an ARUSER signal, an ARVALID signal, an ARREADY signal, etc.), and a variable '$R' for a name of a port for a read address channel signal (e.g., a RID signal, a RDATA signal, a RRESP signal, a RLAST signal, a RUSER signal, a RVALID signal, a RREADY signal, etc.), and may match each port name (PORT_NAME) of the port list 420a with the variables $AW, $W, $B, $AR and $R to check whether each port included in the port list 420a is the port of the AMBA bus. In some embodiments, a port that is not the port of the AMBA bus may be removed from the port list 420a. Although FIG. 5 illustrates an example of the regular expression 600a being used to determine whether a port is a port for the write address channel signal, the write data channel signal, the write response channel signal, the read address channel signal and the read data channel signal, in some example embodiments, it may also be used to determine whether the port is a port for a clock signal and a reset signal.

The analyzing module 230a may be used to extract channel type information about a channel of the IP based on the port list 420a (S530). In some embodiments, the analyzing module 230a may be used to generate the channel type information representing whether the IP has only a read channel, has only a write channel or has both of the read channel and the write channel. For example, the analyzing module 230a may determine that the IP has only the read channel when the port list 420a includes only ports for the read address channel signal and the read data channel signal.

In FIG. 6A, a master interface 710a and a slave interface 730a having a read channel 750a and 770a including a read address channel 750a and a read data channel 770a are illustrated. For example, in a case where the IP is an IP including the master interface 710a having only the read channel 750a and 770a or an IP including the slave interface 730a having only the read channel 750a and 770a, the port list 420a may includes only ports for the read address channel 750a and the read data channel 770a, and the analyzing module 230a may determine that the IP has only the read channel. The analyzing module 230a may determine that the IP has only the write channel when the port list 420a includes only ports for the write address channel signal, the write data channel signal and the write response channel signal.

In FIG. 6B, a master interface 710b and a slave interface 730b having a write channel 750b, 770b and 790b including a write address channel 750b, a write data channel 770b and a write response channel 790b are illustrated. For example, in a case where the IP is an IP including the master interface 710b having only the write channel 750b, 770b and 790b or an IP including the slave interface 730b having only the write channel 750b, 770b and 790b, the port list 420a may includes only ports for the write address channel 750b, the write data channel 770b and the write response channel 790b, and the analyzing module 230a may determine that the IP has only the write channel. The analyzing module 230a may determine that the IP has both of the read channel and the write channel when the port list 420a includes ports for the read address channel signal and the read data channel signal and ports for the write address channel signal, the write data channel signal and the write response channel signal.

The analyzing module 230a may extract bus type information about a bus to which the IP is connected based on the port list 420a (S540). In some embodiments, the analyzing module 230a may be used to extract the bus type information indicating that the bus to which the IP is connected is, for example, an AXI bus, an AXI-Lite bus, an ACE bus, an ACE-Lite bus, an AHB, an ASB and an APB. As illustrated in FIG. 7, in a case where the port list 420a includes a port for a snoop address (AC) channel signal, a snoop response (CR) channel signal or a snoop data (CD) channel signal (S810: YES), the analyzing module 230a may generate the bus type information indicating the ACE bus (S820). In a case where the port list 420a includes a port for an AWSNOOP signal, an ARSNOOP signal, an AWDOMAIN signal or an ARDOMAIN signal (S830: YES), the analyzing module 230a may generate the bus type information indicating the ACE-Lite bus (S840). Further, in a case where the port list 420a includes a port for a WID signal (S850: YES), the number of bits of each of an AWLEN signal and an ARLEN signal is 4, and the number of bits of each of an AWLOCK signal and an ARLOCK signal is 2 (S860: YES), the analyzing module 230a may generate the bus type information indicating an AMBA 3 AXI bus (S870). In a case where the port list 420a does not include a port for the WID signal (S850: NO), the number of bits of each of the AWLEN signal and the ARLEN signal is 8, and the number of bits of each of the AWLOCK signal and the ARLOCK signal is 1 (S880: YES), the analyzing module 230a may generate the bus type information indicating an AMBA 4 AXI bus (S890).

The analyzing module 230a may be used to extract bit width information about respective ports based on the port list 420a (S550).

Further, the analyzing module 230a may extract information representing whether the IP is a bus master or a bus slave based on the port list 420a (S560). For example, in a case where an AWREADY signal, a WREADY signal or an ARREADY signal is input from the bus, and a BREAD signal or a RREADY signal is output to the bus, the analyzing module 230a may generate the information indicating the bus master. Further, in a case where the AWREADY signal, the WREADY signal or the ARREADY signal is output to the bus, and the BREAD signal or the RREADY signal is input from the bus, the analyzing module 230a may generate the information indicating the bus slave.

Accordingly, the port information 440a including at least one of the port type information, the port bit width information, the port transfer direction information, the channel type information and the bus type information may be generated based on the port list 420a.

A transactor generating module 250a may generate an empty design file for the IP of which an internal unit is removed from the design file 170a (S570). FIG. 8A illustrates a system-on-chip 900a including a plurality of IPs 910, 920, 930, 940, 950 and 960a and a bus 990. For example, the system-on-chip 900a may include, as the plurality of IPs 910, 920, 930, 940, 950 and 960a, a central processing unit (CPU) 910, a memory 920, such as a random access memory (RAM), a memory controller (MC) 930 that controls an external memory 935, a graphic processing unit (GPU) 940, a multi-format codec (MFC) block 950, and a predetermined IP 960a. Port information 440a may be extracted with respect to at least one IP 960a of the plurality of IPs 910, 920, 930, 940, 950 and 960a, and the transactor generating module 250a may generate an empty design file for the IP 960a of which an internal unit 970a (e.g., an internal logic, an internal circuit, etc.) is removed. The transactor generating module 250a may further remove an internal wiring, an internal resister signal, etc. from the design file where the internal unit 970a is removed, and, in some example embodiments, may pull up or down a predetermined port. The design file for the IP 960a of which the internal unit 970a has been removed may be included in a file list of the system-on-chip 900a instead of the original design file 170a for the IP 960a when the bus 990 of the system-on-chip 900a is being verified.

The transactor generating module 250a may generate at least one transactor 400a corresponding to the IP based on the port information 440a (S580). The transactor 400a may transmit or receive a signal from or to the bus instead of the IP when the bus to which the IP is connected. For example, as illustrated in FIG. 8B, a system-on-chip 900b may include the IP 960b of which the internal unit 970a illustrated in FIG. 8A is removed, and thus the IP 960b may not transmit or receive the signal. That is, when the bus 900 of the system-on-chip 900b is verified, the transactor 980 may transmit or receive the signal from or to the bus 900 instead of the IP 960b of which the internal unit 970a is removed. According to certain embodiments of the inventive concept, when the bus 900 of the system-on-chip 900b is verified, any one or more of the CPU 910, the memory 920, the MC 930, the GPU 940, the MFC block 950, a power management unit (PMU), a file system (FSYS) lock, an image signal processor (ISP), and the like may be replaced with one or more corresponding transactors.

Figure 9:
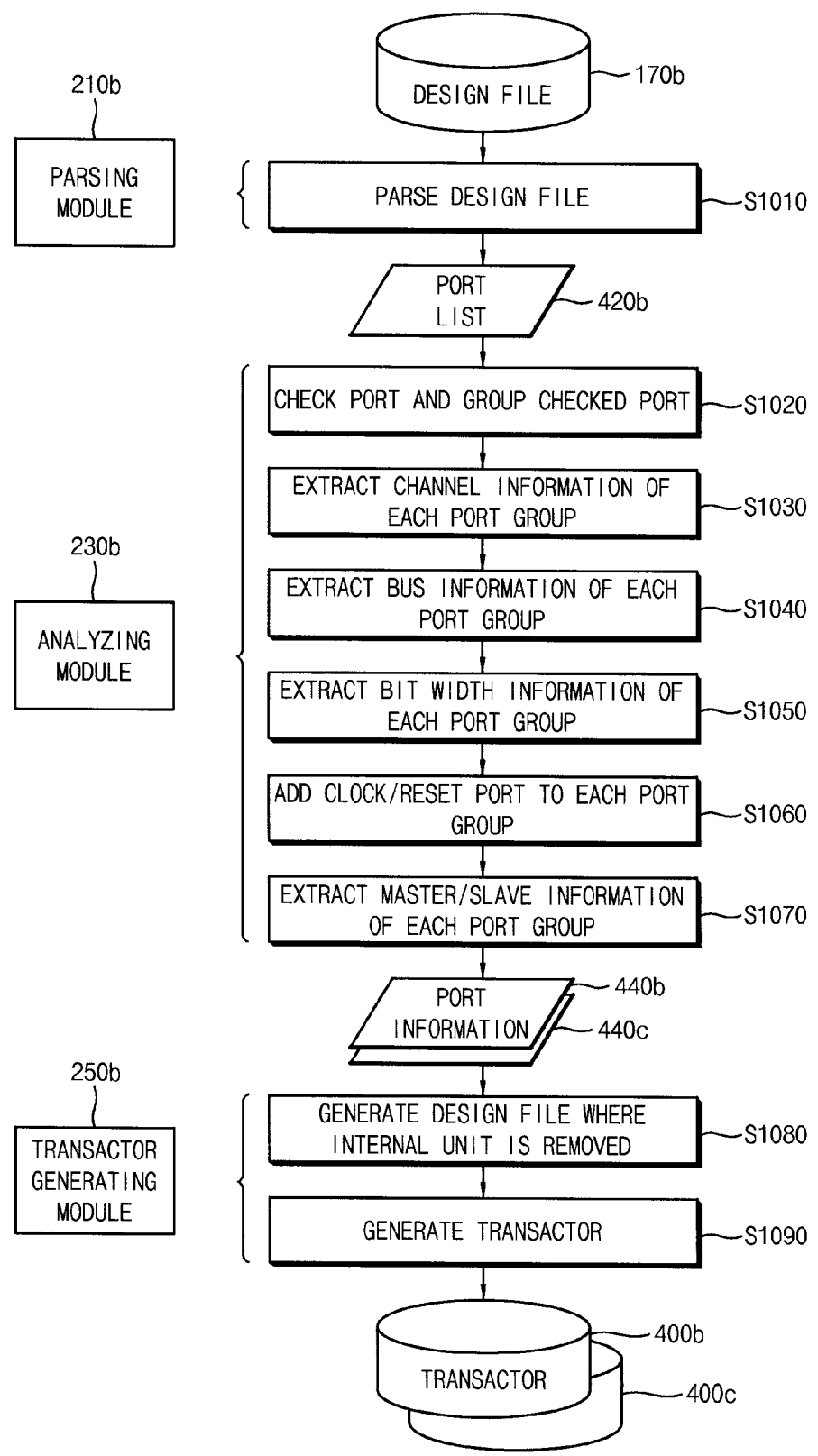
FIG. 9 is another somewhat more detailed flow chart illustrating a method of generating a transactor according to embodiments of the inventive concept.
Figures 10, 11A:
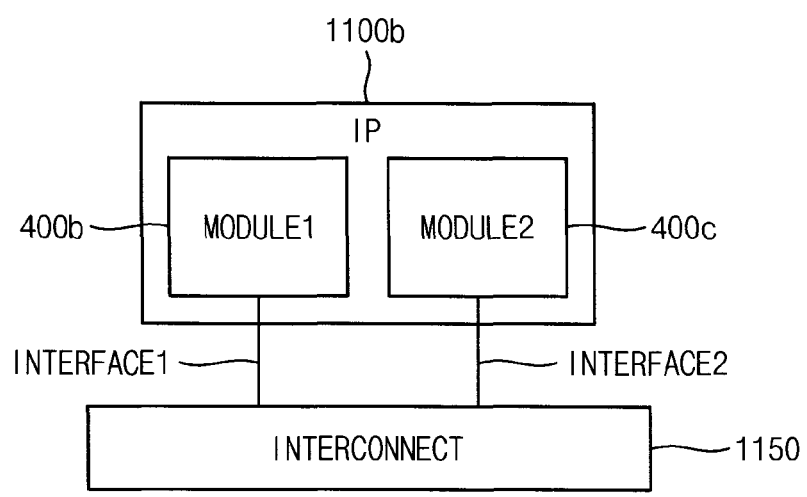
FIG. 10 is one example of the port list of FIG. 9.
FIG. 11A is a block diagram illustrating an example of an IP having two bus interfaces.
Figure 11B:
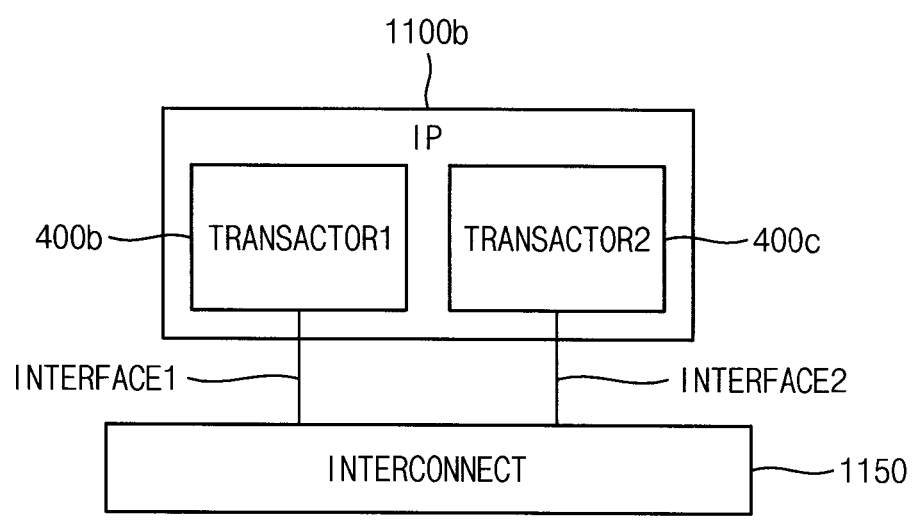
FIG. 11B is a comparative block diagram illustrating an example of an IP having its internal unit replaced with two transactors.

FIG. 9 is a flow chart summarizing another more detailed method of generating a transactor according to embodiments of the inventive concept. FIG. 10 is a table showing in one example the port list of FIG. 9. FIG. 11, inclusive of FIG. 11A and FIG. 11B, is a comparative example of an IP having two bus interfaces, wherein the block diagram of FIG. 11B illustrates an example of an IP having its internal unit replaced by two transactors.

Referring to FIG. 9, a parsing module 210b may be used to generate a port list 420b for a plurality of ports of an IP by parsing a design file 170b for the IP (S1010). As illustrated in FIG. 10, the port list 420b may be a list of port names (PORT_NAME), bit widths (BIT_WIDTH) and directions (DIRECTION) of the plurality of ports of the IP. For example, the port list 420b of FIG. 10 may include a port having a port name of "AWID_GRP1", a bit width of 4 and a direction where a signal is output, a port having a port name of "AWADDR_GRP1", a bit width of 32 and a direction where a signal is output, a port having a port name of "AWID_GRP2", a bit width of 4 and a direction where a signal is output, and a port having a port name of "AWADDR_GRP2", a bit width of 32 and a direction where a signal is output.

An analyzing module 230b may be used to generate port information 440b of the IP by analyzing the port list 420b (S1020, S1030, S1040, S1050, S1060 and S1070).

The analyzing module 230b may be used to determine whether each port included in the port list 420b is a bus port that satisfies a predetermined standard, and may group the ports into at least one bus group according to a bus interface of the IP (S1020). For example, the analyzing module 230b may determine whether each port is a port for a write address channel signal, a write data channel signal, a write response channel signal, a read address channel signal and a read data channel signal. Further, the analyzing module 230b may be used to group the checked ports into at least one bus group according to the bus interface.

FIG. 11A illustrates an IP 1100a including two bus interfaces INTERFACE1 and INTERFACE2. The IP 1100a may include two internal modules 1110 and 1120 respectively having the two bus interfaces INTERFACE1 and INTERFACE2, and the IP 1100a may be coupled to an interconnect 1150 of a bus via the two bus interfaces INTERFACE1 and INTERFACE2. In this case, the analyzing module 230b may group ports corresponding to a first bus interface INTERFACE1 into a first port group, and may group ports corresponding to a second bus interface INTERFACE2 into a second port group. In example embodiments, the analyzing module 230b may group the ports included in the port list 420b into the at least one port group according to the port names (PORT_NAME) of the respective ports. As illustrated in FIG. 10, the port having the port name of "AWID_GRP1" and the port having the port name of "AWADDR_GRP1" may be grouped into the first port group (PORT GROUP1), and the port having the port name of "AWID_GRP2" and the port having the port name of "AWADDR_GRP2" may be grouped into the second port group (PORT GROUP2). Although FIG. 10 illustrates an example where the ports are grouped according to a postfix of the port name (PORT_NAME), in some example embodiments, the ports may be grouped according to a prefix of the port name (PORT_NAME) or according to a combination of the prefix and the postfix of the port name (PORT_NAME).

The analyzing module 230b may be used to extract channel type information of each port group based on the port list 420b (S1030). In some embodiments, the analyzing module 230b may be used to generate the channel type information representing whether each port group has only a read channel, only a write channel, or both the read channel and the write channel.

The analyzing module 230b may be used to extract bus type information about a bus to which each port group is connected (S1040). In some embodiments, the analyzing module 230b may be used to extract the bus type information representing that the bus to which each port group is connected is which bus of an AXI bus, an AXI-Lite bus, an ACE bus, an ACE-Lite bus, an AHB, an ASB and an APB.

The analyzing module 230b may extract bit width information about respective ports included in each port group (S1050).

The analyzing module 230b may add a clock port and/or a reset port to each port group including address, data and/or response ports (S1060). For example, the analyzing module 230b may search ports having port names including "CLK" or "RESETn" from the port list 420b, and may add the searched ports to a corresponding port group.

Accordingly, the port information 440b and 440c for each port group including at least one of information about types of the ports in the port group, information about the bit widths of the ports in the port group, information about a type of a channel corresponding to the port group, information about a type of a bus to which the port group is connected, and information about whether the port group has a master property or a slave property may be generated based on the port list 420b.

A transactor generating module 250b may generate an empty design file for the IP of which an internal unit is removed from the design file 170b (S1080). The transactor generating module 250b may generate a plurality of transactors 400b and 400c respectively corresponding to the plurality of port groups based on the port information 440b and 440c (S1090). In some embodiments, the transactor generating module 250b may generate one transactor 400b and 400c per port group. In an example where a bus to which the IP 1100a of FIG. 11A is being verified, an internal unit of the IP 1100a including the internal modules 1110 and 1120 may be removed, and—as illustrated in FIG. 11B—two transactors 400b and 400c may transmit or receive a signal from or to the interconnect 1150 via corresponding bus interfaces INTERFACE) and INTERFACE2, respectively.

Figure 12:
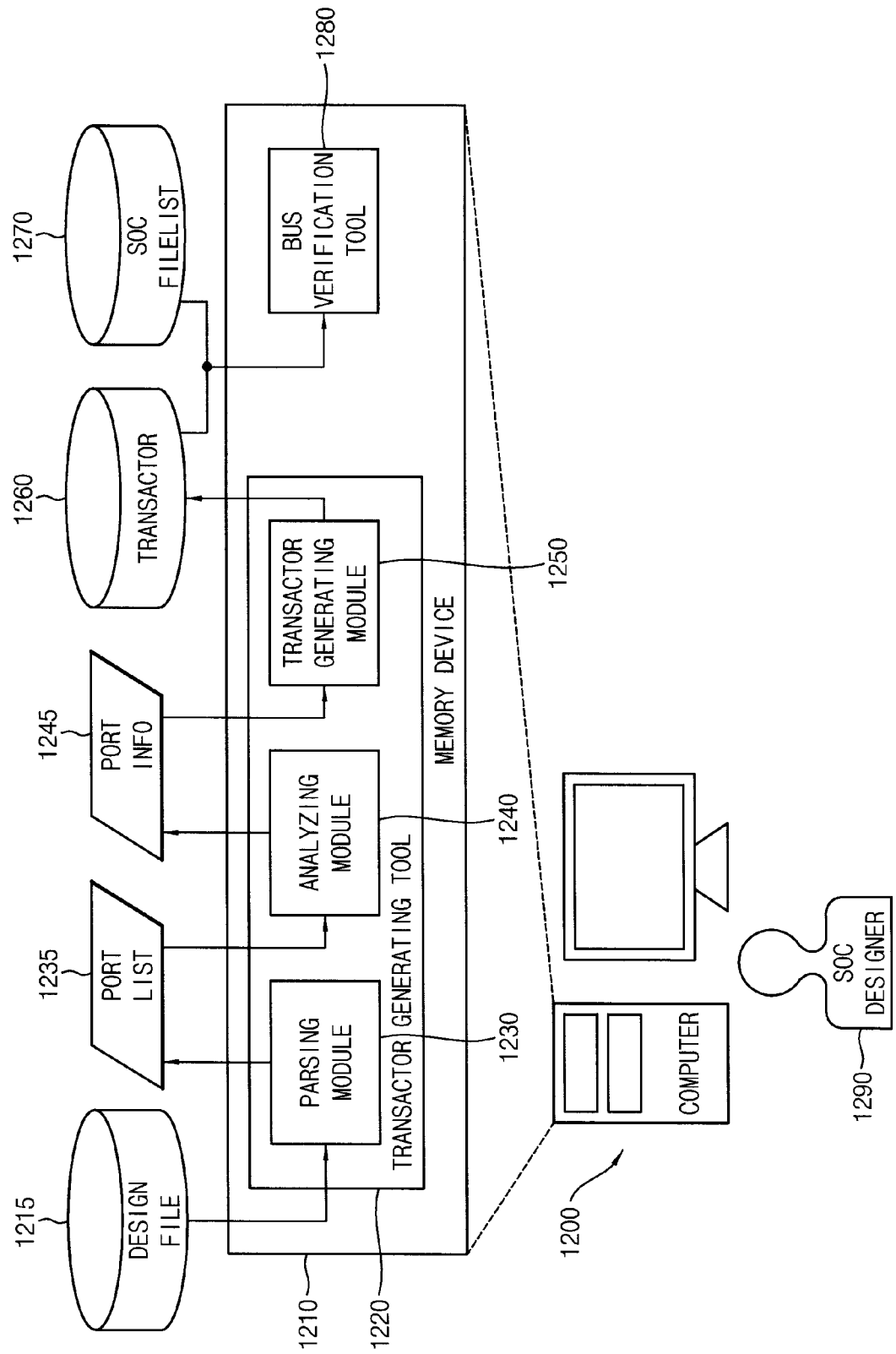
FIG. 12 is a block diagram illustrating a computing system that is capable of verifying the performance of a bus using at least one transactor according to certain embodiments of the inventive concept.

FIG. 12 is a block diagram illustrating a computing system capable of verifying a bus using a transactor according to certain embodiments of the inventive concept. FIG. 13 is a flow chart summarizing a method of verifying a bus using a transactor according to embodiments of the inventive concept.

Referring to FIG. 12, a computing system 1200 including a processor 1210 and a memory device 1210. The memory device 1210 may be used to store and provide executable access to a design file 1215 associated with an intellectual property (IP), a transactor generating tool 1220, and a bus verification tool (or a bus verification simulator) 1280. The processor 1210 may be used to execute the transactor generating tool 1220 and/or the bus verification tool 1280 loaded in the memory device 1210.

Referring to FIGS. 12 and 13, the transactor generating tool 1220 executed by the processor 1210 may be used to extract port information 1245 from the design file 1215 (S1310). In some embodiments, a parsing module 1230 included in the transactor generating tool 1220 may be used to generate a port list 1235 for one or more ports associated with the IP by parsing the design file 1215, and an analyzing module 230 included in the transactor generating tool 1220 may be used to generate port information 1245 for the IP by analyzing the port list 1235.

The transactor generating tool 1220, or a transactor generating module 1250 included in the transactor generating tool 1220 may be used to generate at least one transactor 1260 associated with IP based on the port information 1245 (S1330). The transactor generating tool 1220 may be used in certain embodiments to generate, as in the case of transactor 1260, transactor configuration information (or a transactor configuration file), a transactor component (which may be implemented in software), or both the transactor configuration information and transactor component. In some embodiments, the transactor generating tool 1220 may further be used to generate an empty design file for the IP, wherein an internal unit is removed from the design file 1215 to generate the empty design file. The empty design file for the IP may then be inserted instead of the original design file 1215 for the IP into a file list 1270 for the SoC.

The bus verification tool (or the bus verification simulator) 1280 may be used to verify the operation of a SoC bus based on the file list 1270 including an empty design file and the transactor 1260 (S1350). For example, one or more of IPs included in the SoC may be replaced with a corresponding one or more transactors 1260. To verify interconnects between the IPs, bus performance including signal transfer speed by the bus, or similar bus operating characteristic, the bus verification tool 1280 may transfer a signal to SoC bus using the transactors 1260. In some embodiments, the result of SoC bus verification by the bus verification tool 1280 may be provided to a SoC designer 1290 via an output device (e.g., a display device) of the computing system 1200.

As described above, the computing system 1200 may be used to verify the bus using one or more transactor(s), and a bus verification method according to embodiments of the inventive concept may be used to automatically generate the transactor(s) 1260 for the IP. Accordingly, human error, transactor generation time, and overall SoC bus verification time may all be reduced.

Various embodiments of the inventive concept may be applied to different circuit(s), device(s) and/or system(s) including at least one IP. In particular, certain embodiments of the inventive concept may be applied to different systems-on-chip to provide an effective bus performance verification tool in relation to the system-on-chip.

The foregoing embodiments and description are illustrative. Although a few embodiments have been described, those skilled in the art will readily appreciate that many modifications to the illustrated embodiments are possible without materially departing from the scope of the following claims. Accordingly, all such modifications fall within the scope of the inventive concept as defined by the claims.

What is claimed is:

1. A system-on-chip (SoC) bus verification device for verifying a bus of an SoC, comprising:
   a memory device configured to store a file list for the SoC including a design file associated with an intellectual property (IP) and a transactor generating tool; and
   a processor configured to execute the transactor generating tool stored in the memory device, wherein the transactor generating tool when executed by the processor causes the processor to:
   extract port information for the IP from the design file;
   generate at least one transactor associated with the IP based on the port information; and
   replace the design file of the IP included in the file list for the SoC with an empty design file and the generated transactor.

2. The SoC bus verification device of claim 1, wherein the port information includes at least one of; port type information, bit width information, transfer direction information, channel type information and bus type information for at least one port associated with the IP.

3. The SoC bus verification device of claim 1, wherein the transactor generating tool comprises:
   a parsing module that generates a port list for a plurality of ports used by the IP by parsing the design file;

an analyzing module that generates the port information by analyzing the port list; and a transactor generating module that generates the at least one transactor based on the port information.

4. The SoC bus verification device of claim 3, wherein the port list generated by the parsing module includes at least one of: a list of names, bit widths for the plurality of ports, and directions for the plurality of ports.

5. The SoC bus verification device of claim 4, wherein the analyzing module also groups the plurality of ports into at least one port group according to the list of names included in the port list.

6. The SoC bus verification device of claim 5, wherein the port information generated by the analyzing module includes at least one of: type information for ports in the port group, bit width information for the ports in the port group, channel type information corresponding to the port group, bus type information about a bus connected to the port group, and information indicating whether the port group has a master property or a slave property.

7. The SoC bus verification device of claim 5, wherein the transactor generating module generates at least one transactor for each one of the at least one port group.

8. The SoC bus verification device of claim 3, wherein the transactor generating module also generates an empty design file for the IP by removing an internal unit of the design file.

9. A system-on-chip (SoC) bus verification device for verifying a bus of an SoC, comprising:
 a memory device that stores a file list for the SoC including a design file associated with an intellectual property (IP), a transactor generating tool and a bus verification tool; and
 a processor configured to execute the transactor generating tool and the bus verification tool stored in the memory device,
 wherein the transactor generating tool when executed by the processor causes the processor to:
  extract port information from the design file;
  automatically generate at least one transactor associated with the IP based on the extracted port information; and
  replace the design file of the IP included in the file list with an empty design file and the generated transactor, and
 wherein the bus verification tool upon when executed by the processor causes the processor to:
  verify performance of the bus of the SoC connected to the IP using the at least one transactor; and
  report a result of the verification for the performance of the bus of the SoC.

10. The SoC bus verification device of claim 9, wherein the port information includes at least one of: port type information, bit width information, transfer direction information, channel type information and bus type information for at least one port used by the IP.

11. The SoC bus verification device of claim 9, wherein the transactor generating tool comprises:
 a parsing module that generates a port list for a plurality of ports used by the IP by parsing the design file;
 an analyzing module that generates the port information by analyzing the port list; and
 a transactor generating module that generates the at least one transactor associated with the IP based on the port information.

12. The SoC bus verification device of claim 9, wherein the at least one transactor transmits a signal to or receives a signal from the bus in emulation of the IP.

13. The SoC bus verification device of claim 9, wherein the bus is one of an advanced extensible interface (AXI) bus, an AXI-Lite bus, an AXI coherency extensions (ACE) bus, an ACE-Lite bus, an advanced high performance bus (AHB), an advanced system bus (ASB) or an advanced peripheral bus (APB).

* * * * *